United States Patent [19]

Van Gilst

[11] Patent Number: 4,719,875
[45] Date of Patent: Jan. 19, 1988

[54] HOG FEEDER WITH FLEXIBLE AGITATOR

[75] Inventor: Carl W. Van Gilst, Goshen, Ind.

[73] Assignee: Agri-Plastics, Inc., Goshen, Ind.

[21] Appl. No.: 880,069

[22] Filed: Jun. 30, 1986

[51] Int. Cl.⁴ .......................... A01K 5/00; A01K 5/02
[52] U.S. Cl. ................................... 119/53.5; 119/52 A; 119/54
[58] Field of Search .................. 119/53.5, 52 A, 54, 119/53, 56 R, 51.11, 51.12, 51.13, 52 R, 51 FS; 222/406, 407, 228

[56] References Cited

U.S. PATENT DOCUMENTS

| | | |
|---|---|---|
| 368,161 | 8/1887 | Nichols . |
| 920,806 | 5/1909 | Wright . |
| 950,518 | 3/1910 | Sieffert . |
| 1,132,973 | 3/1915 | Rappleye . |
| 1,341,887 | 6/1920 | Dohn . |
| 1,825,633 | 9/1931 | McDougall . |
| 1,879,247 | 9/1932 | Holliday . |
| 2,158,253 | 5/1939 | Reynolds . |
| 2,309,997 | 2/1943 | Thieman . |
| 3,940,116 | 2/1976 | Verlinden et al. ............ 259/45 |
| 4,182,675 | 1/1980 | Jeris ............................. 210/8 |
| 4,200,060 | 4/1980 | Van Daele ................... 119/53 X |
| 4,279,220 | 7/1981 | Kukurba ................... 119/56 R X |
| 4,353,329 | 10/1982 | Thibault . |
| 4,385,591 | 5/1983 | Petersen ........................ 119/54 X |
| 4,444,151 | 4/1984 | Bohlmann . |
| 4,462,338 | 7/1984 | Thibault . |

FOREIGN PATENT DOCUMENTS

| | | | |
|---|---|---|---|
| 16015 | 5/1912 | Denmark ...................... 119/53.5 |
| 269082 | 12/1912 | Fed. Rep. of Germany . |
| 2563078 | 10/1985 | France ............................. 119/54 |
| 210111 | 1/1924 | United Kingdom . |

Primary Examiner—Carl D. Friedman
Assistant Examiner—Richard E. Chilcot, Jr.
Attorney, Agent, or Firm—Wendell E. Miller

[57] ABSTRACT

A feeder (10) for dispensing feed to livestock includes a hopper (14), a discharge opening (28) in a lower portion (18) of the hopper (14), a vertical shaft (32) in the hopper (14) that extends downward through the discharge opening (28), an animal-actuated actuator arm (66) that extends radially outward from the shaft (32) below the discharge opening (28), and a flexible agitator (70) that is disposed in the hopper (14) that has a tip (88) at a first radial distance (74), and that elastically bends to reduce the first radial distance (74) to smaller (96, 106, and 110) radial distances in response to various resistances of packed feed, thereby reducing the torque that is required to agitate packed feed.

28 Claims, 7 Drawing Figures

HOG FEEDER WITH FLEXIBLE AGITATOR

BACKGROUND OF THE INVENTION

1. Field of the Invention

The present invention relates to devices for agitating bulk material in a hopper to achieve accurate and uniform flow of the bulk material through a discharge opening of the hopper. More particularly, the present invention relates to animal feeders and to devices for agitating the feed in the hopper and thereby achieving accurate and uniform flow of the feed to a feed trough.

2. Description of the Prior Art

Raising farm animals for the meat is a highly competitive industry; and so it is essential that the blend of feed must produce the greatest weight gain in relation to cost. However it is equally important that wastage of feed be avoided.

Among the feeds that are used for raising hogs, high moisture grains are used, such as corn and milo. These grains are ground, sometimes mixed with other nutrients, and stored, sometimes in a silo. The moisture contents of these feeds may be quite high, sometimes twenty-five to thirty percent, or even thirty-five percent moisture.

High fat feeds are also economical feeds for feeding farm animals such as hogs. High fat feeds include from one up to five percent animal fat; and so they tend to stick and clog an animal feeder.

Common to the industry have been hog feeders that include a hopper, an opening in the lower portion of the hopper for discharging feed into a feed trough, a vertically-disposed shaft in the hopper that extends downwardly through the discharge opening, a distribution disk or a feed sweep for controlling the flow of feed through the discharge opening, and an animal-actuated arm for turning the shaft.

The distribution disk, or feed sweep, has been disposed on the shaft and has been located either immediately above, or immediately below the discharge opening. Turning the shaft and the distribution disk has caused feed to flow through the discharge opening.

In U.S. Pat. Nos. 4,353,329 and 4,462,338, Thibault discloses an animal feeder in which he combines an animal-actuated feed arm with a feed sweep for metering the flow of feed from the discharge opening of the hopper; and in U.S. Pat. No. 4,462,338, Thibault includes a metering disk in the hopper to cooperate with the feed sweep in supplying the flow of feed to the hopper.

Animal feeds, especially if they have a fairly high moisture content, or if they have a high fat content, tend to bridge across the hopper near the discharge opening. Therefore, in order to obtain reliable flow of the feed through the discharge opening, it has been necessary to provide some means of agitating the feed inside the hopper and close to the discharge orifice.

Reynolds, in U.S. Pat. No. 2,158,253, discloses a feeder in which an agitator rod is fastened to a vertically disposed shaft and extends radially outward from the shaft. In his design, the shaft and agitator are stationary; and the hopper is turned by animals eating from the trough.

In contrast, in U.S. Pat. No. 4,353,329, Thibault uses an elongated rod for an agitator which is similar to the agitator used by Reynolds; but Thibault rotates the shaft and agitator rod inside a stationary hopper.

Bohlmann, in U.S. Pat. No. 4,444,151, discloses a design in which an animal-actuated lever and a feed agitator are formed by a flat and elongated strip of metal that extends upwardly though the discharge opening into the hopper to provide a feed agitator, and that extends downwardly and radially outward from the discharge opening to provide an animal-actuated arm.

The high moisture feeds, and the high fat feeds, particularly after being stored for a length of time, tend to pack into a firm mass. Sometimes these feeds pack into a mass that is so resistant to being agitated that animals at a feeder are unable to provide sufficient force to an actuating arm to agitate the feed and start the flow of additional feed through the discharge opening. At other times, these high moisture and high fat feeds will pack so hard that the agitator rod will be broken as the feeding animal actuates the actuator arm in an attempt to obtain additional feed from a clogged animal feeder.

Animal feeders of the prior art designs have not achieved the economy that is necessary to profitable animal feeding because of wasting feed.

One of primary causes of wasting has been the result of feeding excessive quantities of feed into a feed trough. Typically, animal-actuated arms have been placed where rooting animals accidentally actuate the actuator arm as they eat from feed already in the trough. Thus, even when an abundance, or even an excess of feed is already in the trough, more feed is discharged by the eating animals. Typical of such designs are those shown by Thibault, in U.S. Pat. Nos. 4,353,329 and 4,462,338, and by Bohlmann in U.S. Pat. No. 4,444,151.

Another cause of wasting feed has been that some animal feeders dump feed on top of the heads or snouts of eating animals. Subsequently, this feed is carried out of the feeder as the animal leaves the feed and soon falls onto the ground or into the mud where it is lost.

A third cause of wasting feed with prior art designs is that the animals must leave the feeder and go to another location for drinking water.

SUMMARY OF THE INVENTION

In the present invention, an animal feeder includes a circular base unit having a circular feed trough that is disposed between outer and inner diameters, and having a circular feed ramp that extends conically inwardly and upwardly from the feed trough.

A hopper is positioned over the base unit, is attached to the base unit, and includes a lower portion having a discharge opening in the lower portion that is positioned radially inward from the feed trough and over the feed ramp.

The feed trough is divided into separate feeding zones by a plurality of vertically disposed and circumferentially spaced separation bars that are secured to the outer diameter of the feed trough and that are spaced to permit the head of one animal to feed in each feeding zone.

A vertically-disposed shaft is disposed in the hopper and extends downwardly through the discharge opening; a flexible agitator is disposed in the hopper proximal to the discharge opening and is operatively attached to the shaft for angular rotation thereby; and a plurality of animal-actuated arms are operatively attached to the shaft and extend radially outward and downward over the feed ramp.

As an option, one watering nipple is shared by each of two feeding zones. Each watering nipple is disposed radially inward of the inner diameter of the feed trough and projects upwardly through the conical feed ramp.

It is a primary object of the present invention to provide an animal feeder in which agitation of the feed is achieved by less torque, and by exerting a smaller force on an animal-actuated arm, than has heretofore been achieved.

It is an object of the present invention to reduce the chance of an agitator rod breaking in a feeder when the feed is severely packed.

It is another object of the present invention to provide an animal feeder in which additional feed is delivered to the feed trough by volitional action of the feeding animals and not by accident as they feed.

It is another object of the present invention to provide a feeder in which the feed is deflected radially inward of the heads of the feeding animals, and delivered to the feed trough by a feed ramp, as opposed to being dropped onto their heads.

It is another object of the present invention to limit the radial width of the feed trough, and to concentrate the feed over a small area, by curving the feed trough downwardly between outer and inner edges of the feed trough.

It is another object of the present invention to provide means for watering the eating animals without the animals removing their heads from the feeder.

Also, it is an object of the present invention to provide a metering disk that includes two different slopes, and that can be reversibly assembled to achieve different feed metering characteristics.

BEST MODE FOR CARRYING OUT THE INVENTION

Figure 1:
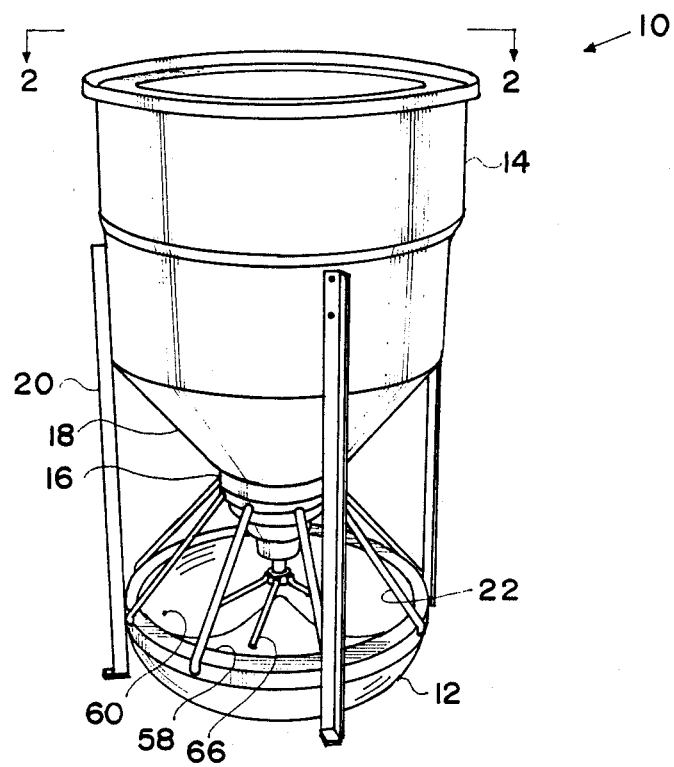
FIG. 1 is an isometric view of a preferred embodiment of the present invention.
Figure 2:
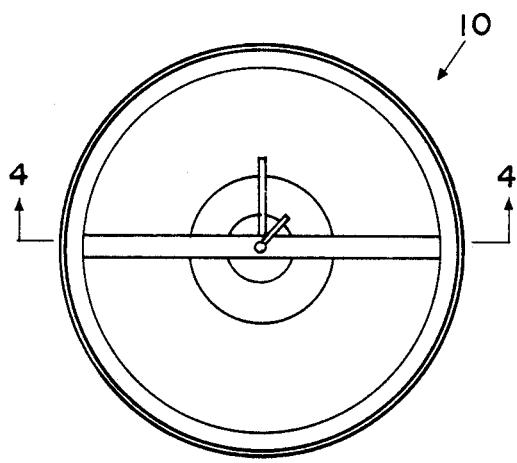
FIG. 2 is a top view of the embodiment of FIG. 1, taken substantially as shown by view line 2—2 of FIG. 1.
Figure 4:
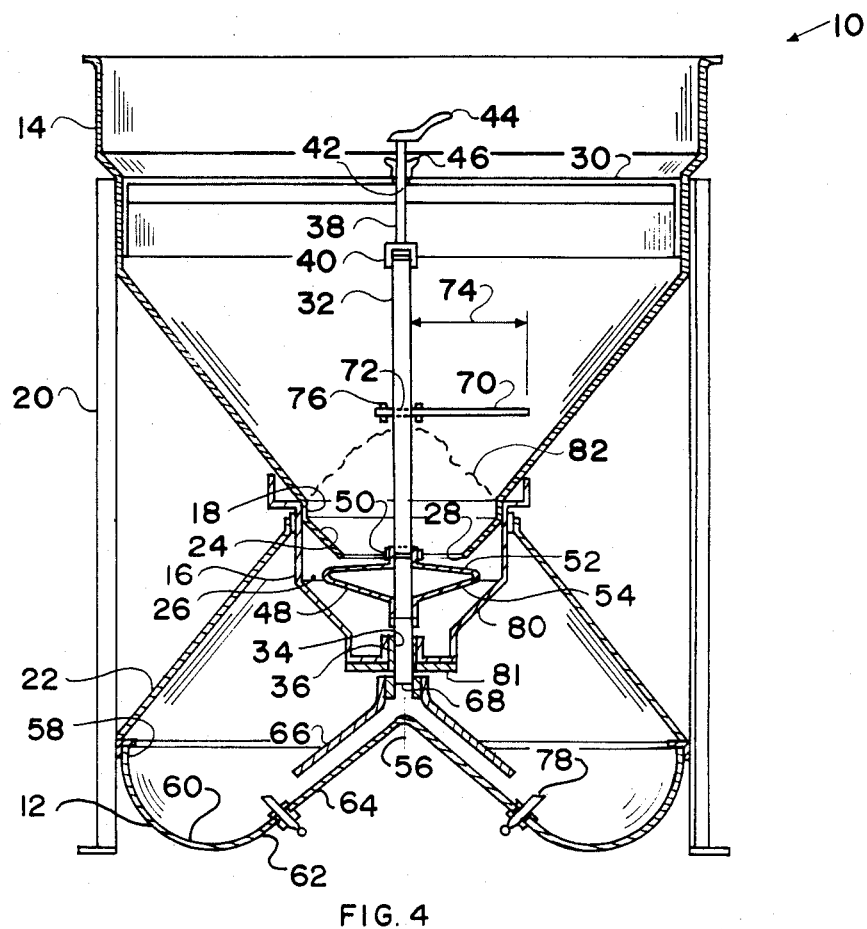
FIG. 4 is a cross sectional elevation of the embodiment of FIG. 1, taken substantially as shown by section line 4—4 of FIG. 2, but with the flexible agitator rotated ninety degrees.

Referrring now to the drawings, and more particularly to FIGS. 1, 2, and 4, an animal feeder 10 includes a base unit 12, a hopper 14 that is disposed above the base unit 12, a distribution housing 16 that is positioned intermediate of the base unit 12 and the hopper 14 and that receives a lower portion 18 of the hopper 14, a plurality of hopper supports 20 that are vertically disposed and circumferentially spaced, and that are fixedly secured to both the base unit 12 and the hopper 14, and a plurality of feed trough dividers 22 that are circumferentially spaced around the animal feeder 10.

The feed trough dividers 22 are fixedly secured to the base unit 12; and the feed trough dividers 22 are fixedly secured to both the lower portion 18 of the hopper 14 and to the distribution housing 16. This securing of the feed trough dividers 22 to both the lower portion 18 and the distribution housing 16 is effective to fixedly secure the lower portion 18 to the distribution housing 16.

The lower portion 18 of the hopper 14 includes a truncated cone 24 that extends downwardly into a distribution chamber 26 that is formed between the distribution housing 16 and the lower portion 18; and the truncated cone 24 terminates at a circular discharge opening 28.

A cross bar 30 is diametrically disposed across the hopper 14 distal from the lower portion 18 and is fixedly secured to the hopper 14. A vertical shaft 32 is rotatably mounted in a bearing 34 that is disposed in a bore 36 of the distribution housing 16. The vertical shaft 32 is connected to a threaded adjusting rod 38 by a swivel connector 40. The threaded adjusting rod 38 extends upwardly through a threaded hole 42 in the cross bar 30. The threaded adjusting rod 38 and the vertical shaft 32 are raised and lowered by rotating a handle 44 that is attached to the threaded adjusting rod 38; and the vertical position of the vertical shaft 32 is locked by screwing a wing nut 46 downwardly on the threaded adjusting rod 38 and against the cross bar 30.

A metering disk 48 is disposed on the vertical shaft 32 and in the distribution chamber 26, extends circumferentially around the vertical shaft 32, and is fixedly secured to the vertical shaft 32 by a bolt 50. The metering disk 48 includes a first conical surface 52 that slopes downward and a second conical surface 54 that slopes upward at a greater angle than the first conical surface 52 slopes downward. The metering disk 48 is reversible, and so optionally, the second conical surface 54 may be positioned upwardly.

The base unit 12 includes a center 56, a circular outer edge 58 that is disposed radially outward from the center 56 and circumferentially therearound, a circular feed trough 60 that is disposed radially inward of the outer edge 58 and that terminates at a circular inner edge 62, and a conical feed ramp 64 that extends both radially inward and upward from the circular inner edge 62.

The circular feed trough 60 extends both radially inward and downward from the circular outer edge 58; extends both radially outward and downward from the circular inner edge 62; and curves downwardly between the circular outer edge 58 and the circular inner edge 62.

A plurality of actuator arms 66 are spaced circumferentially around the vertical shaft 32, are fixedly secured proximal to a bottom end 68 of the vertical shaft 32, and extend downwardly and outwardly above the conical feed ramp 64.

A flexible agitator 70 is disposed in a hole 72 that extends transversely through the vertical shaft 32 proximal to the discharge opening 28, extends radially outward from the vertical shaft 32 for a first radial distance 74, and is retained in the hole 72 by retainers 76. Preferably the flexible agitator 70 is cut from a plastic rod. Typically, the agitator is 4.75 millimeters in diameter and extends 25.0 centimeters from the vertical shaft 32.

For purposes of defining flexibility, a flexible agitator 70, is flexible if one end of the flexible agitator 70 can be elastically flexed to an axis that is ninety degrees from the other end of the flexible agitator, and will substantially straighten itself after being flexed.

Optionally, the animal feeder 10 includes a plurality of animal watering nipples 78 that are disposed radially inward from the inner edge 62 of the circular feed trough 60, that are spaced circumferentially around the conical feed ramp 64, and that extend upwardly through the conical feed ramp 64.

In operation, the hopper 14 is filled with animal feed (not shown) up to approximately the level of the cross bar 30; a water supply (not shown) it connected to the watering nipples 78; and, optionally, the person filling the hopper 14 can manually actuate one of the actuator arms 66 to deposit an initial supply of feed in the circular feed trough 60.

As animals (not shown), for instance hogs, feed at the circular feed trough 60, they individually stick their heads between a pair of adjacent ones of the feed trough dividers 22. The feed trough dividers 22 are spaced to allow entrance of the head of one eating animal, and to preclude the animal from entering the animal feeder 10.

As the hogs consume the feed that is in the circular feed trough 60, one or more of the animals reach further inward and upward with their snouts and actuate one or more of the actuator arms 66, sometimes in one direction, and sometimes in the other direction, until sufficient feed is dropped into the circular feed trough 60 to satisfy all of the hogs that the quantity in the feed trough 60 is sufficient for the time being.

Actuation of the actuator arms 66 angularly rotates the vertical shaft 32, which is sometimes in one direction, and sometimes in the other direction. This angular rotation serves two purposes. One purpose is to meter feed from the hopper 14 to the circular feed trough 60; and the other purpose is to agitate feed in the hopper and thereby to achieve reliable flow of feed from the hopper 14 to the feed trough 60.

Metering of the flow of feed from the hopper 14 to the feed trough 60 is accomplished by angularly rotating the metering disk 48, and by rotating the first conical surface 52 when the animal feeder 10 is assembled as shown in FIG. 4, or by rotating the second conical surface 54 when the metering disk 48 is assembled with the second conical surface 54 disposed upwardly.

The metering action of the flow is caused by relative movement between the metering disk 48 and the portion of the truncated cone 24 that is proximal to the discharge opening 28, resultant movement between particles of feed that are disposed between the discharge opening 28 and the metering disk 48, and the first conical surface 52 of the metering disk 48.

Figure 3:
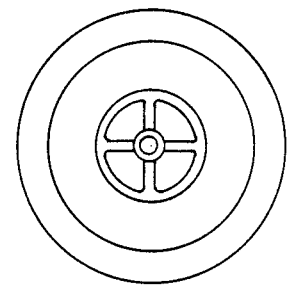
FIG. 3 is a partial bottom view of the embodiment of FIG. 1, taken substantially as shown by view line 3—3 of FIG. 4.

As feed is metered radially outward from the discharge opening 28 and between the metering disk 48 and the truncated cone 24 of the hopper 14, it falls downwardly, it is deflected radially inward by a frustoconical portion 80 of the distribution housing 16, drops through a plurality of discharge apertures 81 of the distribution housing 16, which are shown in FIG. 3, drops onto the conical feed ramp 64, and slides radially outward and downward into the circular feed trough 60.

Angular rotation of the vertical shaft 32, and resultant angular rotation of the flexible agitator 70 is effective to start the flow of feed downward to the discharge opening 28 and the metering disk 48 when high moisture content, high fat content, or other causes, have resulted in the feed bridging across the hopper 14 proximal to the truncated cone 24, as shown by first phantom lines 82 of FIG. 4.

Figures 5, 6, 7:
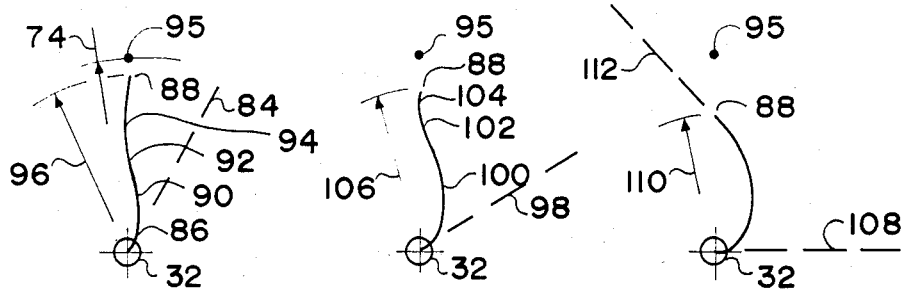
FIG. 5 is a top view of the flexible agitator of the present invention, taken substantially as shown in FIG. 2, but with the vertical shaft rotated thirty degrees clockwise from the position as shown in FIG. 2.
FIG. 6 is a top view of the flexible agitator of FIG. 5, taken substantially as shown in FIG. 6, but with the vertical shaft rotated sixty degrees.
FIG. 7 is a top view of the flexible agitator of FIGS. 5 and 6, taken substantially as shown in FIGS. 5 and 6, but with the vertical shaft rotated ninety degrees.

Referring now to FIG. 5, the vertical shaft 32 has rotated clockwise thirty degrees as indicated by a second phantom line 84, and inner end 86 of the flexible agitator 70 has been displaced circumferentially by rotation of the vertical shaft 32 and the flexible agitator 70; but the packed feed (not shown) has kept the flexible agitator 70 from agitating the feed near a tip 88 of the flexible agitator 70; so the feed has been agitated in a portion of the hopper 14 that is both radially and circumferentially proximal to a first curved portion 90 of the flexible agitator 70, and has been somewhat less agitated proximal to an inflection curve 92 of the flexible agitator 70; but a straight portion 94 of the flexible agitator 70 has merely been pulled radially inward, as shown by the difference in radical distances between the first radial distance 74 of a point 95 and a second radial distance 96 of the tip 88 of the flexible agitator 70.

Referring now to FIG. 6, the shaft 32 has been rotated a total of sixty degrees clockwise, as indicated by a third phantom line 98, the flexible agitator 70 includes a larger curved portion 100, a second inflection curve 102, and a shorter straight portion 104, and the tip 88 of the flexible agitator 70 is pulled back to a third radial distance 106 from the shaft 32.

Referring now to FIG. 7, the shaft 32 has been rotated a total of ninety degrees clockwise, as indicated by a fourth phantom line 108, the entire length of the flexible agitator 70 is now curved as shown, and feed is being agitated radially outward to a fourth radial distance 110 wherein the tip 88 of the flexible agitator 70 is now located.

Angular rotation of the vertical shaft 32 by animals actuating the actuator arms 66 is ramdon in direction. Sometimes the animals will rotate the vertical shaft 32 for several revolutions in one direction before reversing the direction of rotation; and sometimes they will reverse the rotation after rotating the shaft 32 only part of a rotation in one direction.

As can be observed in FIG. 7, if rotation continues in a clockwise direction, and if the feed is very firmly packed, then the flexible agitator 70 will be wrapped farther around the shaft 32 and the tip 88 will be pushed radially inward more than is shown in FIG. 7. However, whether or not the tip 88 is pushed farther in initially, with additional rotation of the shaft 32, the tip 88 will agitate feed farther and farther outward as packed feed that is disposed radially inward is broken up into loose particles.

However, if the direction of rotation of the shaft 32 is reversed from a condition similar to that shown in FIG. 7, then flexible agitator 70 will resist developing the reverse bend of the inflection curve 102 of FIG. 6. So, instead of the tip 88 of the flexible agitator 70 entering the packed feed exactly as it was pulled back therefrom, the tip 88 of the flexible agitator 70 will be poked into the packed feed in a direction somewhat as shown by a fifth phantom line 112 of FIG. 7, thereby providing an agitating action.

Thus, it can be seen that the flexible agitator 70 will progressively break up packed feed into the individual grain particles thereof, whether rotation of the shaft 32 is in one direction for several revolutions and the tip 88 progressively moves radially as the shaft 32 turns, or whether the shaft 32 is rotated only part of a rotation in one direction before the direction of rotation is reversed and the packed feed is progressively broken up by alternate bending of the flexible agitator and poking of the tip 88.

Also, it can be seen that the torque that is required to rotate the shaft 32 and to agitate the feed is greatly reduced by the afore-described elastic bending of the flexible agitator 70 and the resultant reduction in the radial distance to the tip 88.

If the angular rotation of the shaft 32 is in a first direction, as shown in FIG. 7, then the flexible agitator 70 will bend in a first direction as shown in FIG. 7; but if the direction of rotation of the shaft 32 is in a second direction, then the bending of the flexible agitator 70 will be in a second and opposite direction to that which is shown.

As an example of the significant reduction in the torque that is required to angularly rotate the shaft 32 and agitate the feed when using feeds that tend to pack, in one test, a typical hog feed, consisting primarily of corn ground to a meal, and having a moisture content of approximately fifteen percent, required a torque of 101 netwon-meters to rotate the shaft 32 when a rigid rod having a diameter of 4.76 millimeters and a length of 25.4 centimeters was used.

In contrast, with a nylon rod having a diameter of 4.76 millimeters and a length of 25.4 centimeters, a torque of only 20.3 newton-meters was required to rotate the shaft 32 and agitate the feed in the hopper 14.

Thus, it can be seen that the flexible agitator 70 of the present invention reduces the amount of torque that is required to agitate feed to about twenty percent of the torque that is required to agitate the feed when a conventional rigid agitator is used.

Since the feed is deflected inwardly by the frustoconical portion 80 and slides down the conical feed ramp 64, the animal feeder 10 does not deposit feed on the heads of eating animals, and loss of feed by animals carrying it out of the feeder on their heads, is obviated.

Also, since feed is delivered on demand as feeding animals deliberately reach inwardly and upwardly to actuate the actuator arms 66, overfilling of the feed trough 60, and wastage of feed by spilling over the outer edge 58, is obviated.

Further, since watering means is provided without the necessity of the feeding animals removing their heads from the animal feeder 10, there is even less material carried out of the feeder on the heads or snouts of the animals.

Industrial Applicability

The present invention is applicable to feeding domesticated animals, and wild animals that are caged or maintained in a reservation; and the present invention is particularly applicable to feeding hogs.

What is claimed is:

1. A device (10) for dispensing feed, which device comprises:
    a hopper (14) having a lower portion (18), and having a discharge opening (28) in said lower portion;
    a shaft (32), being disposed in said hopper;
    actuator means (66), being operatively connected to said shaft, for imparting angular rotation to said shaft that is in a first direction; and
    agitator means, comprising a flexible agitator (70) that is disposed in said hopper, that is operatively attached to said shaft, and that extends outwardly from said shaft for a first radial distance (74), for agitating feed in said hopper that is proximal to said flexible agitator in response to said angular rotation of said shaft in said first direction, for elastically bending said flexible agitator in a first direction, and for reducing said first radial distance to a second radial distance (96, 106, or 110) in response to a first predetermined resistance of said feed to said angular rotation of said shaft in said first direction; whereby
    said elastic bending and said reduction of said first radial distance to said second radial distance automatically limits the torque that is required to agitate said feed.

2. A device (10) as claimed in claim 1 in which said flexible agitator (70) comprises an elongated rod.

3. A device (10) as claimed in claim 1 in which said actuator means (66) provides angular rotation both in said first direction and in a second direction; and
    said angular rotation in said second direction causes elastic bending of said flexible agitator (70) in a second direction and reduction in said first radial distance (74) to a third radial distance (96, 106, or 110) in response to a second predetermined resistance of said feed to said angular rotation of said shaft (32) in said second direction; whereby
    said elastic bending of said flexible agitator automatically limits the torque that is required for angular rotation of said shaft in both of said directions, and for agitation of said feed by said actuator means.

4. A device (10) as claimed in claim 3 in which said actuator means comprises means (66) for animal actuation of said shaft (32).

5. A device (10) as claimed in claim 4 in which said shaft (32) extends outwardly through said hopper (14); and
    said actuator means comprises an actuating arm (66) that extends outwardly from said shaft.

6. A device (10) as claimed in claim 4 in which said flexible agitator (70) comprises an elongated plastic rod having a substantially uniform cross sectional area.

7. A device (10) as claimed in claim 1 in which said shaft (32) extends outwardly through said discharge opening (28);
    said actuator means comprises an actuating arm (66); and
    said device includes means (22) for limiting actuation of said actuating arm generally to the head of an animal.

8. A device (10) as claimed in claim 7 in which said flexible agitator (70) comprises an elongated rod.

9. A device (10) as claimed in claim 7 in which said actuator means (66) provides angular rotation both in said first direction and in a second direction; and
    said angular rotation in said second direction causes a reduction in said first radial distance (74) to a third radial distance (96, 106, or 110); whereby
    said elastic bending of said flexible agitator (70) automatically limits the torque that is required for angular rotation of said shaft (32) in both of said directions, and for agitation of said feed by said actuator means.

10. A device (10) as claimed in claim 9 in which said flexible agitator (70) comprises a plastic rod that extends radially outward from said shaft (32) and that has a substantially uniform cross section.

11. A device (10) as claimed in claim 7 in which said device includes a metering disk (48) that is operatively attached to said shaft (32), that is disposed circumferentially around said shaft, and that extends radially outwardly below said discharge opening (28), and that slopes conically downward at a first slope (52) proximal to said discharge opening.

12. A device (10) as claimed in claim 7 in which said metering disk (48) slopes conically upward at a second and greater slope (54) proximal to said discharge opening (28); and said metering disk is installable with said second and greater slope proximal to said discharge opening.

13. A feeder (10) for dispensing feed to livestock, which feeder comprises:

a base unit (12) having a feed trough (60);

a hopper (14) having a lower portion (18), having a discharge opening (28) in said lower portion, being positioned above said base unit, and being operatively attached (20) to said base unit;

shaft means (32), being disposed in said hopper, and extending through said discharge opening, for receiving angular rotational movement;

flexible agitator means, comprising a flexible agitator (70) that is disposed in said hopper, that is operatively attached to said shaft means, and that extends outwardly from said shaft means, for agitating feed in said hopper that is proximal to said flexible agitator in response to angular rotation of said shaft means, and for elastic bending of said flexible agitator in response to a predetermined resistance of said feed to said angular rotation; and actuator means (66) for angularly rotating said shaft; whereby said elastic bending of said flexible agitator automatically limits the torque that is required to agitate said feed, and to assure dependable discharging of said feed through said discharge opening.

14. A feeder (10) as claimed in claim 13 in which said actuator means, comprises means (66) for angular rotation of said shaft means (32) by an animal.

15. A feeder (10) as claimed in claim 14 in which said base unit (12) includes a center (56);

said feed trough (60) includes an outer edge (58) that is disposed distal from said center, and an inner edge (62) that is intermediate of said outer edge and said center of said base unit;

said feed trough extends inwardly and downwardly from said outer edge and outwardly and downwardly from said inner edge;

said base unit includes a feed ramp (64) that extends inwardly and upwardly from said inner edge of said feed trough toward said center of said base unit;

said actuating means comprises an actuating arm (66) that is disposed generally inward and upward from said inner edge of said feed trough;

said discharge opening (28) opening is disposed generally inward from said feed trough and generally above said feed ramp; and said feeder includes means (22) for allowing the head of an animal to extend inward from said outer edge of said feed trough, for allowing said animal to eat from said feed trough, for allowing said animal to actuate said actuating arm with his head, and for preventing the body of said animal from entering said feed trough; whereby said feed is discharged inwardly from said feed trough and slides down said feed ramp to said feed trough, thereby preventing feed from being dropped onto the head of an eating animal, and said location of said animal-actuating means generally prevents accidental actuation of said actuating means by an eating animal.

16. A feeder (10) as claimed in claim 15 in which said feeder includes watering means, comprising a watering nipple (78) that is disposed inwardly from said inner edge (64), for providing drinking water for feeding animals without said animals removing their heads from said feeder.

17. A feeder (10) as claimed in claim 15 in which said feed trough (60) is generally circular, said extending of said feed trough downward from said outer (58) and inner (62) edges comprises a curved cross section of said feed trough; and said feed ramp (64) comprises a generally conical portion.

18. A feeder (10) as claimed in claim 17 in which said device includes watering means, comprising a watering nipple (78) that is disposed inwardly from said inner edge (62) of said feed trough (60), for providing drinking water for feeding animals without said animals removing their heads from said feeder.

19. A feeder (10) as claimed in claim 17 in which said flexible agitator (70) comprises an elongated rod that extends radially outward from said shaft (32).

20. A feeder (10) as claimed in claim 19 in which said elongated rod (70) comprises a plastic rod having a substantially uniform cross sectional area.

21. A feeder (10) as claimed in claim 15 in which said feeder includes a metering disk (48) that is operatively attached to said shaft means (32), that is disposed circumferentially around said shaft means, and that extends outwardly below said discharge opening (28), and that slopes conically downward at a first slope (52) proximal to said discharge opening.

22. A feeder (10) as claimed in claim 21 in which said metering disk (48) slopes conically upward at a second (54) and greater slope proximal to said discharge opening (28); and said metering disk is installable with said second and greater slope proximal to said discharge opening.

23. A feeder (10) for dispensing feed to livestock, which feeder comprises:

a base unit (12) having a feed trough (60) that includes both outer edge (58) and an inner edge (62);

a hopper (14) being disposed above said base unit, being operatively attached (20) to said base unit, having a lower portion (18), and having a discharge opening (28) in said lower portion;

shaft means (32), being disposed in said hopper, and extending through said discharge opening, for receiving angular rotational movement;

metering means (48), being disposed proximal to said discharge opening, and being operatively attached to said shaft means, for metering feed through said discharge opening in response to said angular rotation of said shaft means;

animal-actuated means (66), being operatively attached to said shaft means, and being disposed inwardly and upwardly from said inner edge of said feed trough, for actuation by a feeding animal; and means (22) for allowing the head of an animal to extend inward from said outer edge, for allowing said animal to eat from said feed trough, for allowing said animal to reach inward of said inner edge of said feed trough and actuate said animal-actuated means with its head, and for preventing the body of said animal from entering said feeder; whereby said location of said animal-actuating means generally precludes accidental actuation of said actuator means by an eating animal.

24. A feeder (10) as claimed in claim 23 in which said base unit includes a feed ramp (64) that extends inwardly and upwardly from said inner edge (62) of said feed trough (60) toward said center (56) of said base unit; and said feeder includes means (28 or 81) for depositing said feed onto said feed ramp; whereby said means for depositing said feed onto said feed ramp generally avoids depositing feed on the head of an eating animal.

25. A feeder (10) as claimed in claim 24 in which said feed trough (60) is generally circular and includes a curved cross section; and said feed ramp (64) comprises a generally conical portion.

26. A feeder (10) as claimed in claim 25 in which said feeder includes watering means, comprising a watering nipple (78) that is disposed inwardly from said inner edge, for providing drinking water for feeding animals without said animals removing their heads from said feeder.

27. A feeder (10) as claimed in claim 26 in which said metering means comprises a metering disk (48) that is disposed circumferentially around said shaft means (32), that extends outwardly below said discharge opening (28), and that slopes conically downward at a first slope (52) proximal to said discharge opening.

28. A feeder (10) as claimed in claim 27 in which said metering disk (48) slopes conically upward at a second (54) and greater slope proximal to said discharge opening (28); and said metering disk is installable with said second and greater slope proximal to said discharge opening.

* * * * *